United States Patent
Irazabal et al.

(10) Patent No.: US 11,348,101 B2
(45) Date of Patent: May 31, 2022

(54) POST-SETTLEMENT PROCESSES

(71) Applicant: International Business Machines Corporation, Armonk, NY (US)

(72) Inventors: Jeronimo Irazabal, Buenos Aires (AR); Andres Garagiola, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/225,785

(22) Filed: Dec. 19, 2018

(65) Prior Publication Data
US 2020/0202338 A1  Jun. 25, 2020

(51) Int. Cl.
*G06Q 20/38*   (2012.01)
*G06F 16/182*  (2019.01)
*G06F 16/18*   (2019.01)
*H04L 9/06*    (2006.01)

(52) U.S. Cl.
CPC ....... *G06Q 20/382* (2013.01); *G06F 16/1805* (2019.01); *G06F 16/1824* (2019.01); *G06F 16/1834* (2019.01); *H04L 9/0643* (2013.01); *H04L 2209/38* (2013.01)

(58) Field of Classification Search
CPC ............. H04L 67/104; G06Q 20/3829; G06Q 2220/00; G06Q 20/401
See application file for complete search history.

(56) References Cited

U.S. PATENT DOCUMENTS

| | | | |
|---|---|---|---|
| 10,102,265 B1* | 10/2018 | Madisetti | G06Q 20/0658 |
| 10,333,694 B1* | 6/2019 | Hu | G06F 21/76 |
| 10,365,922 B1* | 7/2019 | Wang | G06F 21/10 |
| 10,673,626 B2* | 6/2020 | Sandberg-Maitland | G06F 16/1834 |
| 10,834,095 B2* | 11/2020 | Irazabal | H04L 9/3263 |
| 10,880,072 B2* | 12/2020 | Menon | H04L 9/3239 |
| 11,095,433 B2* | 8/2021 | Vouk | H04L 9/0643 |
| 11,188,920 B2* | 11/2021 | Irazabal | G06Q 20/42 |

(Continued)

FOREIGN PATENT DOCUMENTS

WO  2017145019 A1  8/2017

OTHER PUBLICATIONS

Ramesh "Rameshthoomu" Babu, fabricdocs Documentation Release 1.0, Feb. 15, 2017 [Retrieved on Jan. 24, 2020], Retrieved from the Internet: <URL:https://readthedocs.org/projects/fabrictestdocs/downloads/pdf/latest/> (Year: 2017).*

(Continued)

*Primary Examiner* — Mohammad Z Shaikh

(57) ABSTRACT

An example operation may include one or more of sending a transmission process from a client with an application, the application coupled to the client, receiving the transmission process from the client via a multistate peer network, the multistate peer network includes a ledger, an endorsement policy, and a smart contract, generating, from the transmission process, a multistate endorsement based ledger process, establishing a threshold state logic and a final state logic via the smart contract, the threshold state logic is set by the minimum number of endorsements required to commit to the ledger set by the endorsement policy, a commitment to the ledger triggers the final state logic, and executing post-settlement processes via the final state logic.

16 Claims, 18 Drawing Sheets

(56) References Cited

U.S. PATENT DOCUMENTS

| | | | |
|---|---|---|---|
| 11,212,076 B2* | 12/2021 | Raman | H04W 72/0446 |
| 11,227,282 B2* | 1/2022 | Natarajan | H04L 9/3247 |
| 2015/0206106 A1* | 7/2015 | Yago | G06Q 20/0655 |
| | | | 705/68 |
| 2017/0103468 A1* | 4/2017 | Orsini | G07F 15/003 |
| 2018/0097779 A1 | 4/2018 | Karame et al. | |
| 2018/0114218 A1 | 4/2018 | Konik et al. | |
| 2018/0121909 A1 | 5/2018 | Christidis et al. | |
| 2018/0123779 A1 | 5/2018 | Zhang | |
| 2018/0144156 A1* | 5/2018 | Marin | G06F 21/6272 |
| 2018/0158034 A1* | 6/2018 | Hunt | G06Q 20/027 |
| 2018/0189100 A1* | 7/2018 | Nemoto | G06F 9/4831 |
| 2018/0191714 A1* | 7/2018 | Jentzsch | H04L 9/3247 |
| 2018/0204213 A1* | 7/2018 | Zappier | H04L 9/0819 |
| 2018/0260909 A1* | 9/2018 | Li | G06Q 40/12 |
| 2018/0322158 A1* | 11/2018 | Zhang | G06F 16/2322 |
| 2018/0365688 A1* | 12/2018 | He | G06Q 20/401 |
| 2019/0043043 A1* | 2/2019 | Saraniecki | G06F 16/1774 |
| 2019/0058709 A1* | 2/2019 | Kempf | H04L 63/10 |
| 2019/0080392 A1* | 3/2019 | Youb | G06Q 40/00 |
| 2019/0102409 A1* | 4/2019 | Shi | H04L 9/0637 |
| 2019/0102423 A1 | 4/2019 | Little et al. | |
| 2019/0104196 A1* | 4/2019 | Li | G06F 9/547 |
| 2019/0150036 A1* | 5/2019 | Nelson | H04W 4/025 |
| | | | 370/395.21 |
| 2019/0182028 A1* | 6/2019 | Arquero | H04L 9/3239 |
| 2019/0188706 A1* | 6/2019 | McCurtis | G06F 9/45558 |
| 2019/0188712 A1 | 6/2019 | Fedorov et al. | |
| 2019/0268140 A1 | 8/2019 | Kandiraju et al. | |
| 2019/0278852 A1* | 9/2019 | Jayachandran | H04L 9/3239 |
| 2019/0303892 A1* | 10/2019 | Yantis | G06Q 10/10 |
| 2019/0305938 A1* | 10/2019 | Sandberg-Maitland | |
| | | | H04L 9/3239 |
| 2019/0340609 A1* | 11/2019 | Mayadas | H04L 9/3239 |
| 2019/0347658 A1* | 11/2019 | Haimes | H04L 9/0637 |
| 2019/0356470 A1 | 11/2019 | Deshpande et al. | |
| 2019/0362361 A1* | 11/2019 | Irazabal | H04L 63/0428 |
| 2019/0384627 A1 | 12/2019 | Caro et al. | |
| 2019/0384927 A1* | 12/2019 | Bhatnagar | H04L 9/0637 |
| 2020/0034353 A1* | 1/2020 | Innocenti | H04L 9/0637 |
| 2020/0067697 A1* | 2/2020 | Puddu | G06F 21/602 |
| 2020/0074470 A1* | 3/2020 | Deshpande | H04L 9/3239 |
| 2020/0111092 A1* | 4/2020 | Wood | G06F 21/645 |
| 2020/0118068 A1* | 4/2020 | Turetsky | G06Q 10/0831 |
| 2020/0119910 A1* | 4/2020 | Ojha | H04L 9/0819 |
| 2020/0145214 A1* | 5/2020 | Linton | G06Q 20/223 |
| 2020/0145221 A1* | 5/2020 | Chao | H04L 63/061 |
| 2020/0151269 A1* | 5/2020 | Christidis | G06Q 20/02 |
| 2020/0151686 A1 | 5/2020 | Komandur et al. | |
| 2020/0159697 A1* | 5/2020 | Wood | G06Q 20/3674 |
| 2020/0167243 A1* | 5/2020 | Rauh | H04L 63/0823 |
| 2020/0177373 A1* | 6/2020 | Komandur | H04L 9/0816 |
| 2021/0042294 A1* | 2/2021 | Srivastava | G06F 16/2379 |
| 2021/0160058 A1* | 5/2021 | Zhang | H04L 9/0637 |

OTHER PUBLICATIONS

Anonymous, "Ledgerhyperledger-fabricdocs master documentation", Retrieved from the internet from URL: https://web.archive.org/web/20170731010523/http://hyperledger-fabricdocs/readthedocis.io:80/cn/latest/ledger.html (Year: 2017).*

Paul, Sam Moses; "Hyperledger Fabric Components-Technical Context",pp. 1-15. (Year: 2018).*

"Architecture Explained-hyperledger-fabricdocs master documentation", Hyperledger 2017, p. 1- (Year: 2017).*

Sukhwani, Harish; Wang, Nan; Trivdedi, Kishor; Rindos, Andy, Performance Modeling of Hyperledger Fabric (Permissioned Blockchain Network), IEEE, pp. 1-10. (Year: 2018).*

Kulkarni, Swapnil, "Developers- Overview: An Introduction to Hyperledger Fabric", Open Source for You; New Delhi, Aug. 1, 2018 , pp. 1-6 (Year: 2018).*

Mao, Dianhui et al., "Credit Evaluation System Based on Blockchain for Multiple Stakeholders in the Food Supply Chain", International Journal of Environmental Research and Public Health, Aug. 1, 2018, pp. 1-21 (Year: 2018).*

H. Javaid, C. Hu and G. Brebner, "Optimizing Validation Phase of Hyperledger Fabric," 2019 IEEE 27th International Symposium on Modeling, Analysis, and Simulation of Computer and Telecommunication Systems (MASCOTS), 2019, pp. 269-275. (Year: 2019).*

P. Thakkar, S. Nathan and B. Viswanathan, "Performance Benchmarking and Optimizing Hyperledger Fabric Blockchain Platform," 2018 IEEE 26th International Symposium on Modeling, Analysis, and Simulation of Computer and Telecommunication Systems (MASCOTS), 2018, pp. 264-276 (Year: 2018).*

Marcus Brandenburger, Christian Cachin, Rüdiger Kapitza, Alessandro Sorniotti, "Blockchain and Trusted Computing: Problems, Pitfalls, and a Solution for Hyperledger Fabric", retrieved from the internet: https://arxiv.org/abs/1805.08541v1 (Year: 2018).*

"Architecture Explained-hypledger-fabricdocs master documentation", Hypledger, 2017, retrieved from the internet: http://hyperledger-fabric.readthedocs.io/en/release/arch-deep-dive.html (Year: 2017).*

M. Swan, "Blockchain temporality: smart contract time specifiability with blocktime," In International symposium on rules and rule markup languages for the semantic web, pp. 184-196. Springer, Cham, 2016.

M. Vukolic; "Rethinking permissioned blockchains," In Proceedings of the ACM Workshop on Blockchain, Cryptocurrencies and Contracts, pp. 3-7. ACM, 2017.

V. Buterin, "A next-generation smart contract and decentralized application platform," white paper (2014).

A. Baliga, N. Solanki, S. Verekar, A. Pednekar, P. Kamat and S. Chatterjee, "Performance Characterization of Hyperledger Fabric," 2018 Crypto Valley Conference on Blockchain Technology (CVCBT), 2018, pp. 65-74 (Year: 2018).

Elli et al., "Hyperledger Fabric: A Distributed Operating System for Permissioned Blockchains", Eurosys '18, Proceedings of the Thirteenth EuroSys Conference, Apr. 2018, pp. 1-15 (Year: 2018).

Guth et al., "Specification Mining for Smart Contracts with Automatic Abstraction Tuning", Jul. 20, 2018, pp. 1-12, (Year: 2018).

H. Sukhwani, N. Wang, K. S. Trivedi and A. Rindos, "Performance Modeling of Hyperledger Fabric (Permissioned Blockchain Network)," 2018 IEEE 17th International Symposium on Network Computing and Applications (NCA), 2018, pp. 1-8 (Year: 2018.

* cited by examiner

640

POST-SETTLEMENT PROCESSES

TECHNICAL FIELD

This application generally relates to a database storage system, and more particularly, to a smart contract for executing post-settlement processes.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by the known lack of customizable logic including processes that can be implemented after information is saved to a centralized database. As such, what is needed is a solution to overcome these significant drawbacks.

SUMMARY

One example embodiment provides a system that includes a processor and memory, wherein the processor is configured to perform one or more of post-settlement processes. The system includes a client. The client includes an application. The application sends a transmission process from the client. The system further includes a multistate peer network. The multistate peer network receives the transmission process from the client and generates a multistate endorsement based ledger process from the transmission process. In one example embodiment, the multistate peer network includes a ledger, an endorsement policy, and a smart contract. The smart contract includes a threshold state logic and a final state logic. The threshold state logic is set by the minimum number of endorsements required to commit to the ledger set by the endorsement policy. A commitment to the ledger triggers the final state logic. The final state logic executes post-settlement processes.

Another example embodiment provides a method that one or more of sending a transmission process from a client with an application, the application coupled to the client, receiving the transmission process from the client via a multistate peer network, the multistate peer network includes a ledger, an endorsement policy, and a smart contract, generating, from the transmission process, a multistate endorsement based ledger process, establishing a threshold state logic and a final state logic via the smart contract, the threshold state logic is set by the minimum number of endorsements required to commit to the ledger set by the endorsement policy, a commitment to the ledger triggers the final state logic, and executing post-settlement processes via the final state logic.

A further example embodiment provides a non-transitory computer readable medium comprising instructions, that when read by a processor, cause the processor to perform one or more of sending a transmission process from a client with an application, the application coupled to the client, receiving the transmission process from the client via a multistate peer network, the multistate peer network includes a ledger, an endorsement policy, and a smart contract, generating, from the transmission process, a multistate endorsement based ledger process, establishing a threshold state logic and a final state logic via the smart contract, the threshold state logic is set by the minimum number of endorsements required to commit to the ledger set by the endorsement policy, a commitment to the ledger triggers the final state logic, and executing post-settlement processes via the final state logic.

DETAILED DESCRIPTION

Figure 1A:
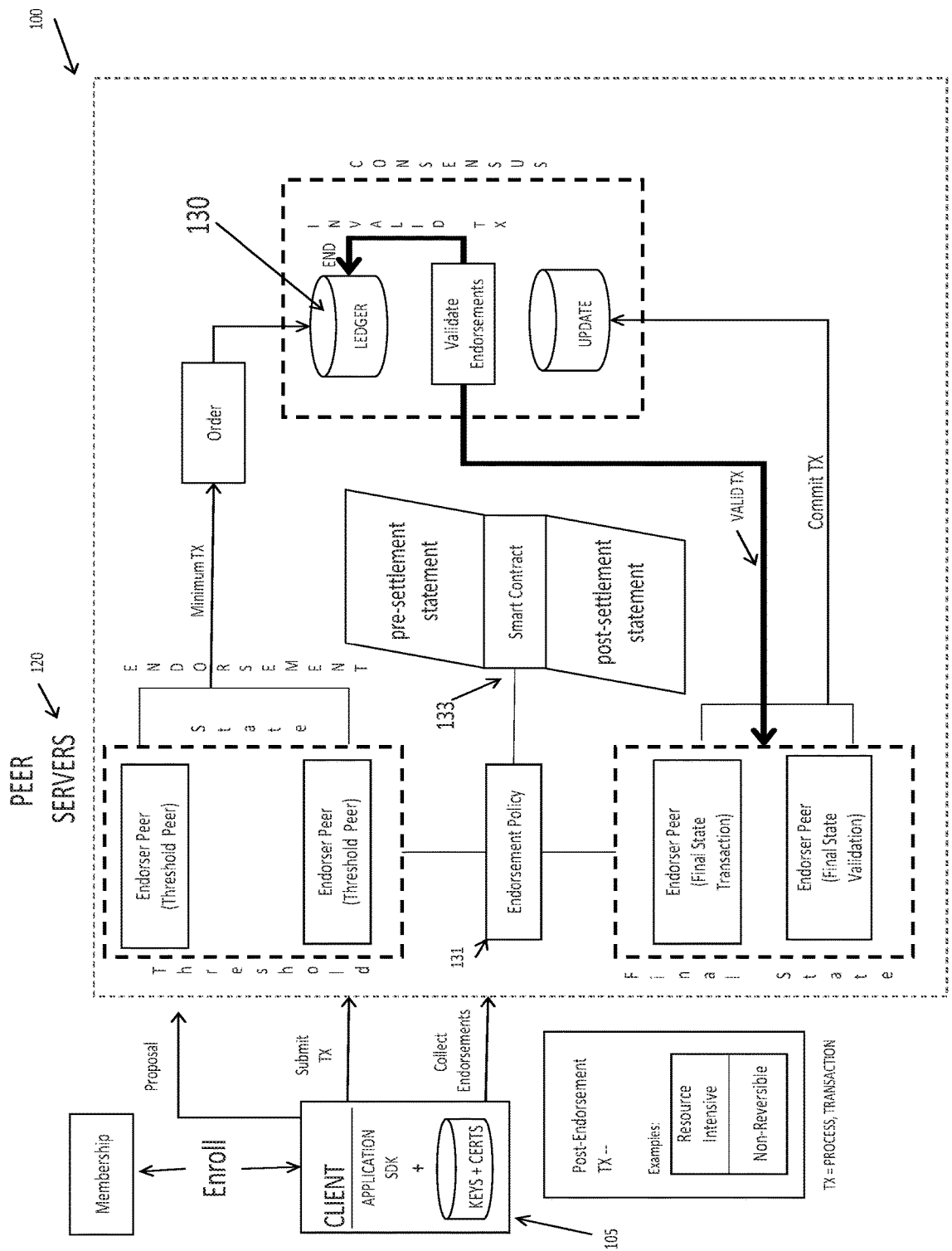
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provides one or more of a smart contract that includes a threshold state logic and a final state logic. The final state logic executes one or more of post-settlement processes after endorsement to the blockchain.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include executing processes after a transaction is validated (i.e. confirmed for commitment) such that the code is not distributed into the network on smart contract deployment time. Accordingly, the smart contract can generate source code for implementation after the current transaction is validated to the block.

To this end, one or more custom logic can be triggered after a validated transaction. With execution of post-settlement processes, resources can be optimized during simulation. In one example embodiment resources can be reduced before the transaction is validated. In one example embodiment the number of transactions can be increased during simulation, especially with the implementation of post-settlement processes.

Chaincodes that include post-settlement processes can thus include non-revertable tasks, such as among others mechanic action and complex operation with external systems. Post-settlement processes further permit such smart contracts to be organized and optimized in customizable ways. In one example embodiment, smart contract source code could be annotated. In one example embodiment, smart contract source code could be divided within a combination of programming methods, functions, and/or operations that indicate execution after a transaction is validated.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, execution of processes after a transaction is validated (i.e. confirmed for commitment) such that the instantiating code is not distributed into the network on smart contract deployment time. One or more post-settlement processes are implemented due to the establishment of a final state logic triggered by a commitment to the ledger and generation of a read-write set, wherein commitment is unique to blockchain architecture. In particular, one example embodiment of a smart contract includes one or more pre-settlement statements and one or more post-settlement statements. A threshold state logic is established by one or more pre-settlement statements. A final state logic is triggered by the commitment to the ledger such that the final state logic is established via the one or more post-settlement statements provided by the chaincode.

One of the benefits of the example embodiments is that it improves the functionality of a computing system by improving resources allocated before and after a transaction is validated especially by executing custom logic that is not required to be distributed into the network during smart contract deployment after commitment to the ledger. Through the blockchain system described herein, a computing system can perform functionality for reducing the resourcing with respect to commitment but increasing the number of transactions that can be simulated associated with validation. This is because of the inclusion of post-settlement statements to one or more of example embodiments of the chaincode such that final state logic is triggered after commitment to the ledger to thereby execute post-settlement processes.

The example embodiments provide numerous benefits over a traditional database. For example, through the blockchain the example embodiments herein provide for executing processes after a transaction is validated (i.e. confirmed for commitment) such that the code is not distributed into the network on smart contract deployment time. Accordingly, a smart contract can generate source code for implementation after the current transaction is validated to the block. Meanwhile, a traditional database could not be used to implement the example embodiments because post-settlement logic provides for computer processing at decentralized local node(s) or peer(s) after commitment to the memory storage ledger or a block. By its very nature, traditional databases are centralized and not based on a blockchain architecture with different processing needs to accommodate a shared decentralized ledger indicative of blockchain architecture. Accordingly, the example embodiments provide for a specific solution to a problem in the field of software and hardware architecture associated with a blockchain ledger.

The example embodiments also change how data may be stored within a block structure of the blockchain. For example, one or more post-settlement statements can be stored within the chaincode associated with generating a read-write set for settlement the data block. By storing a read-write statement at endorsement within data blocks of a blockchain with minimal resources dictated by the chaincode, a final read-write set having a write set reflecting updates resulting from post-settlement processes arising from a final state logic may be appended to an immutable ledger through a hash-linked chain of blocks. In some example embodiments, the data block may be different than a traditional data block by obtaining a final write-set from post-settlement statements of the smart contract with the updated current state and input data that is within a traditional block structure of a blockchain. By minimizing processing resources prior to commitment via adding pre- and/or post-settlement statements to chaincode the blockchain can provide the benefit of increasing the number of transaction that can be simulated for smart contracts.

FIG. 1A illustrates a logic network diagram of system 100 including a database, according to example embodiments. Referring to FIG. 1A, the system 100 includes a client 105 and a multistate peer network 120. The multistate peer network 120 includes a ledger 130, an endorsement policy 131, and a smart contract 133.

Shown in FIG. 1A, the client 105 includes an application, the application sends a transmission process from the client 105. The multistate peer network 120 receives the transmission process from the client 105 and generates a multistate endorsement based ledger process from the transmission process.

The smart contract 133 includes a threshold state logic and a final state logic. The threshold state logic is set by the minimum number of endorsements required to commit to the ledger set by the endorsement policy 131. A commitment to the ledger 130 triggers the final state logic. The final state logic executes post-settlement processes.

In one example embodiment, the smart contract 133 illustrated in FIG. 1A further includes one or more pre-settlement statement(s) and one or more post-settlement statement(s). The one or more pre-settlement statement(s) establishes a threshold state logic, and the one or more post-settlement statement(s) establishes a final state logic.

In one example embodiment, the smart contract 133 further includes one or more threshold endorser peer(s), one or more final state endorser peer(s), and one or more committer peer(s) shown in FIG. 1A. The one or more threshold endorser peer(s) receives the threshold state logic, via the one or more pre-settlement statement(s), and generates a multistate logic process for appending to the ledger when the minimum number of threshold endorser peer endorsements is met to commit to the ledger. The one or more threshold endorser peer(s) generates a read-write set input data for post-settlement processes, via the multistate logic process.

In one example embodiment, the one or more pre-settlement statements receive input data to generate the read-write set. The endorsement policy provides the multistate logic process to the multistate peer network for appending to the ledger, via the endorsement policy.

The commitment (or "settlement") triggers the final state logic to engage the one or more final state endorser peer. The one or more final state endorser peer receives the final state logic, generates a multistate logic process for executing the one or more post-settlement process. Post-settlement statements reduce the amount of time to endorse and submit a transaction. In one example embodiment, transactions in involving storage will receive a time reduction in execution with such post-settlement statements. In one example embodiment, transactions such as querying a database or historical data will receive a time reduction in execution with such post-settlement statements.

In one example embodiment, on completion of the execution of the one or more post-settlement processes, the one or more final state endorser peer and the one or more committer peer(s) appends to the ledger to include updates derived from the one or more post-settlement processes. The one or more committer peer(s) generates a final read-write set. The final read-write set includes a write set updated from the write set created at commitment.

In one example embodiment, the one or more post-settlement processes includes resource-intensive transaction processes. The one or more post-settlement processes can include non-reversible logic.

In one example embodiment, the one or more pre-commit processes minimizes the number of transactions required prior to endorsement and commitment. The one or more post-settlement processes can include a plurality of transactions. The one or more post-settlement processes can include a multiplicity of transactions.

Figure 1B:
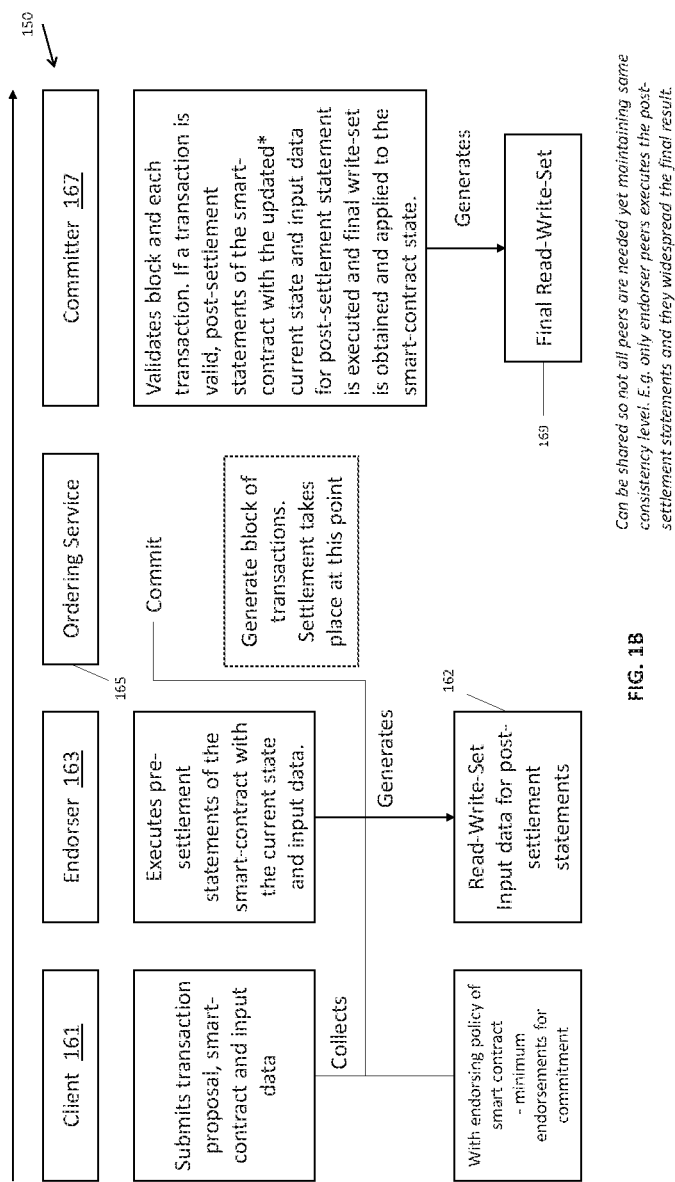
FIG. 1B illustrates a network diagram of a component operating with a database, according to example embodiments.

FIG. 1B illustrates another logic network diagram of a network diagram of a component operating with a database according to example embodiments. Referring to FIG. 1B, the network 150 includes a client 161. With an endorsement policy provided by a smart contract, the client 161 collects the minimal number of endorsements required for commitment.

The network 150 further includes an endorser 163. At commitment, the endorser 163 generates a read-write set input for post-settlement statements 162. The post-settlement statements are provided by the smart contract.

As the read-write set of input data is generated at endorsement, a block of transactions is generated by an ordering service 165 that is further provided by the network 150. In one example embodiment, the ordering service 165 is provided by a multistate peer network that further includes the endorser(s) 163 and a committer(s) 167.

With further reference to FIG. 1B, the committer(s) 167 after commitment by the ordering service validates the block and each transaction. If a transaction is valid, post-settlement statements of the smart contract are updated to include the current write-set state and input data with the committer(s) 167. Thus after commitment, as the final transaction is completed, the committer(s) 167 executes the final post-settlement statement and obtains a write-set to thereby generate a final read-write set 169.

Figure 1C:
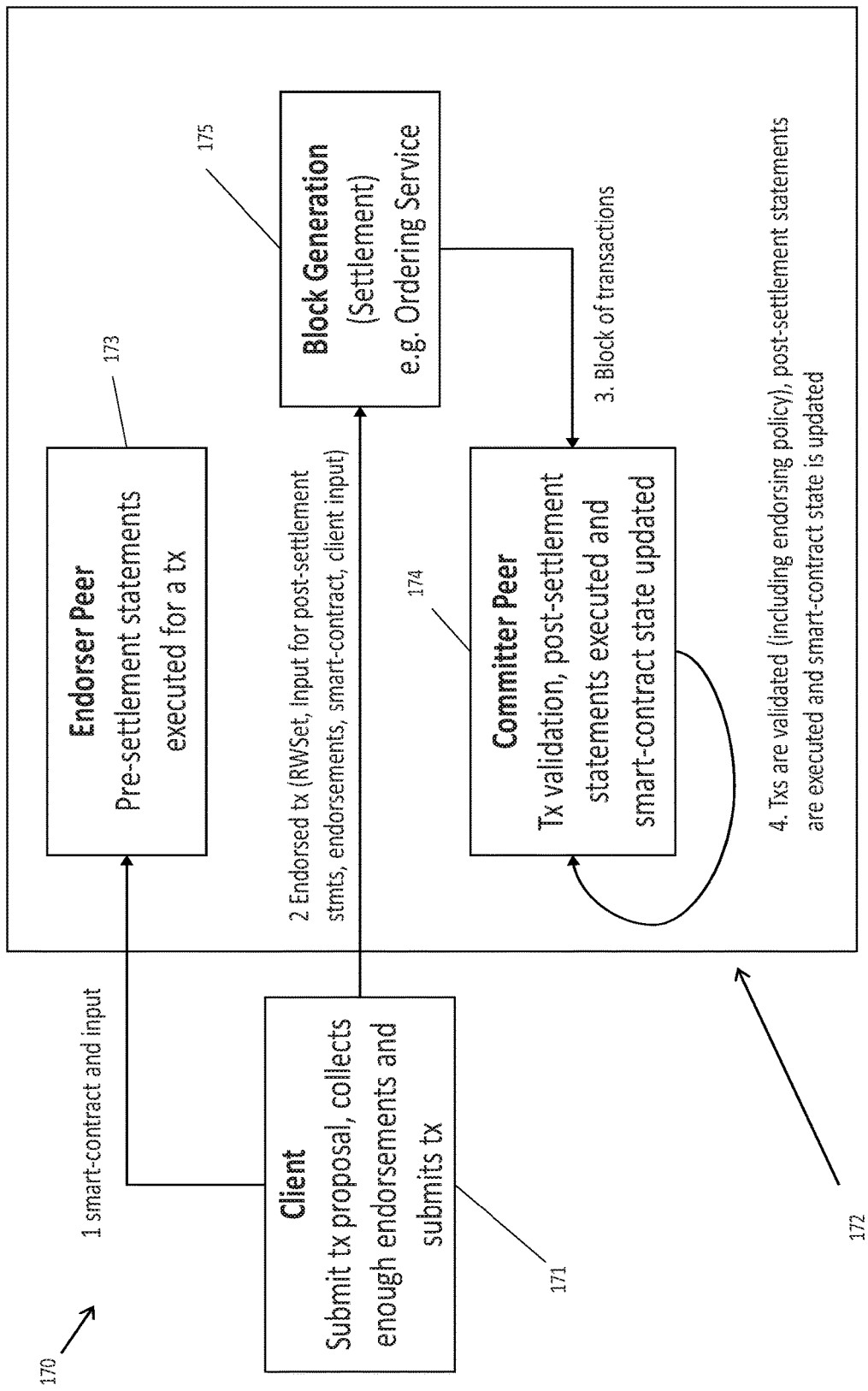
FIG. 1C illustrates a network diagram of one example embodiment of a system including a smart contract for executing post-settlement processes.

FIG. 1C illustrates a network diagram of one example embodiment of a system 170 including a smart contract for executing post-settlement processes. As shown, the system 170 includes a client 171 and a peer network 172. The peer network 172 includes one or more of an endorser peer 173, one or more of a committer peer 174 and an ordering service 175 for generation of each block in the blockchain. Furthermore, one of ordinary skill in the art will readily recognize that each endorser peer 173 is a specific rendering of a committer peer 174.

In operation, the client 171 provides the contract and input to the endorser peer 173. The endorser peer 173 executes pre-settlement statements for a transaction provided by the smart contract. Accordingly, the client 171 collects the minimal number of endorsements from the one or more of the endorser peers 173 that are required to establish a commitment to the block. The client 171 thus provides an endorsed transaction including a read-write set, client input, input for post-settlement statements, and endorsements to the ordering service 175 for generating the current block in the blockchain.

With further reference to FIG. 1C, the committer peer(s) 174 after block generation iteratively validates transactions while executing post-settlement statements provided by the chaincode. Accordingly, the smart-contract state is updated along with the write set that reflects the current state. As all transactions are validated, a final read write set is generated by the one or more of the committer peer(s) 174. In one example embodiment, the final read write set is provided to the ledger at the next successive block.

Figure 1D:
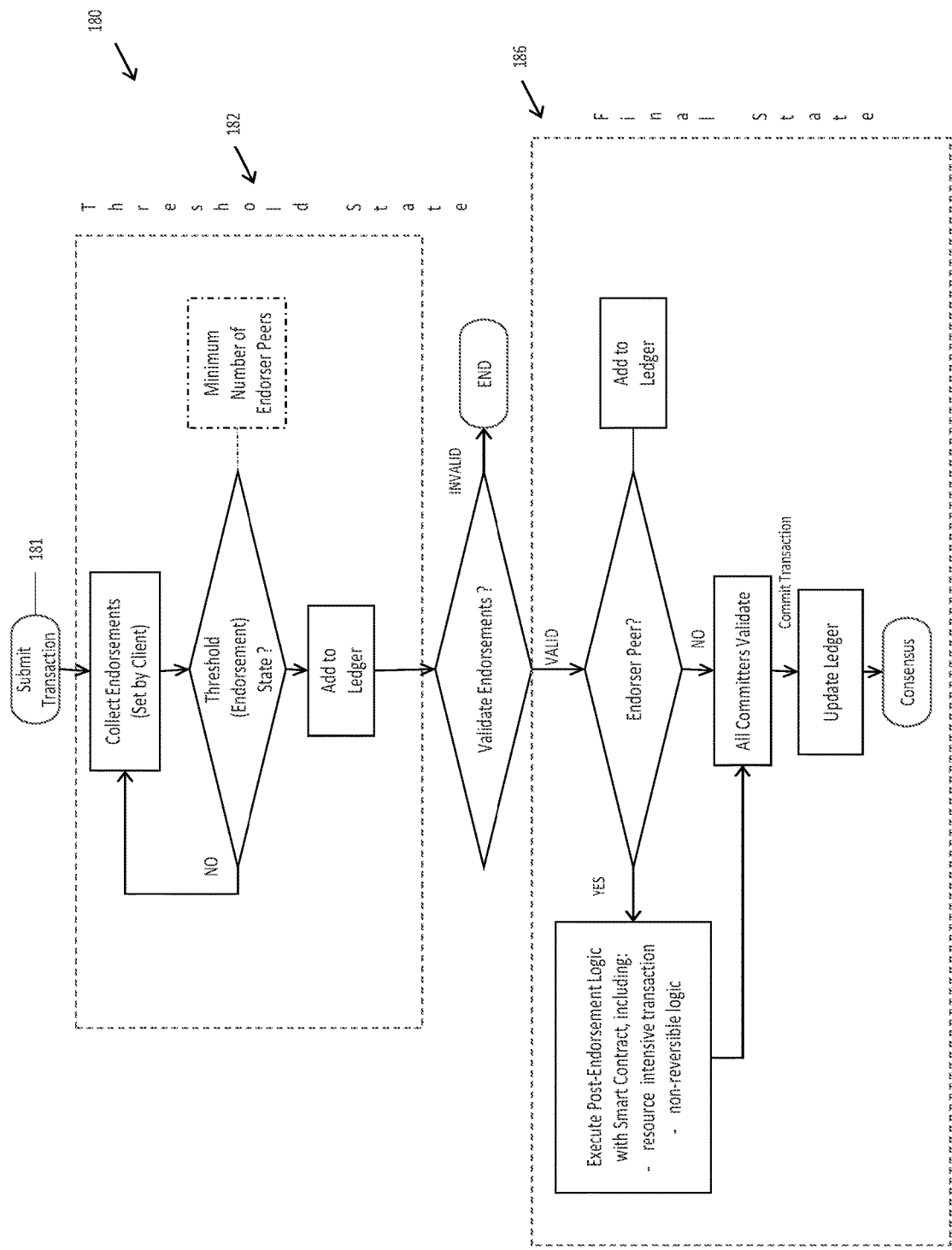
FIG. 1D illustrates a flow diagram, according to example embodiments.

FIG. 1D illustrates a flow diagram of a method 180, according to example embodiments. In step 181, the method 180 starts by a client submitting a transaction to a multistate peer network. The multistate peer network includes an endorser peer, a committer peer(s) and an ordering service.

In step 182, the method 180 establishes a threshold state that iteratively collects the minimum number of endorsements set by the client for commitment to the ledger by the ordering service. At commitment, a read set is generated for the transaction and a write set reflecting the current threshold state is generated as well to collectively define a read-write set.

In step 186, the method 180 validates endorsements after commitment. As shown, if invalid, the method 180 terminates without further resources applied to subsequent processes.

A further exemplary method is appreciated as follows that includes one or more of the following steps. A transmission process is sent from a client with an application, wherein the application is coupled to the client. The transmission process is received from the client via a multistate peer network. In one example embodiment, the multistate peer network includes a ledger, an endorsement policy, and a smart contract. A multistate endorsement based ledger process is generated from the transmission process. A threshold state logic and a final state logic are established. The threshold state logic is set by the minimum number of endorsements required to establish a commit to the ledger set by the endorsement policy. A commitment to the ledger triggers the final state logic. One or more of post-settlement processes are executed via the final state logic.

In one example embodiment, the exemplary method further includes the step of establishing a threshold state logic via one or more pre-settlement statement(s). The smart contract further includes the one or more pre-settlement statement(s).

In one example embodiment, the exemplary method further includes the step of establishing a final state logic via one or more post-settlement statement(s). The smart contract further includes the one or more post-settlement statement(s).

In the exemplary method, the smart contract further includes one or more threshold endorser peer, one or more final state endorser peer, and one or more committer peer(s). In one example embodiment, the exemplary method further includes the step of sending the threshold state logic to the one or more threshold peer.

In one example embodiment, the exemplary method further includes the step of generating a multistate logic process via the one or more threshold peer. The multistate logic process appends to the ledger when the minimum number of threshold endorser peer endorsements is met to thereby commit to the ledger. In one example embodiment, the exemplary method further includes the step of generating a read-write set input data for post-settlement processes via the multistate logic process. In one example embodiment, the exemplary method further includes the step of receiving input data and generating the read-write set via the one or more pre-settlement statement(s). In one example embodiment, the exemplary method further includes the step of providing the multistate logic process for appending to the ledger via the endorsement policy. In one example embodiment, the exemplary method further includes the step of receiving the final state logic, via the one or more final state endorser peer, and generating a multistate logic process for executing the one or more post-settlement process.

In one example embodiment, the exemplary method further includes the step of appending to the ledger, with the one or more committer(s), to include updates derived from the one or more post-settlement processes. Accordingly, a further step is contemplated for generating a final read-write set with the one or more committer(s). In one example embodiment, the write set created at commitment is updated to create a final read-write set.

In one example embodiment, the one or more post-settlement processes includes resource-intensive transaction processes. In one example embodiment, the one or more post-settlement processes includes non-reversible logic. In one example embodiment, the one or more post-settlement processes includes a plurality of transactions. In one example embodiment, the one or more post-settlement processes includes a multiplicity of transactions. In one example embodiment, the one or more pre-settlement processes minimizes the number of transactions required prior to endorsement and commitment.

A further example embodiment provides a non-transitory computer readable medium comprising instructions, that when read by a processor, cause the processor to perform one or more of the following steps. A transmission process is sent from a client with an application, wherein the application is coupled to the client. The transmission process is received from the client via a multistate peer network. In one example embodiment, the multistate peer network includes a ledger, an endorsement policy, and a smart contract. A multistate endorsement based ledger process is generated from the transmission process. A threshold state logic and a final state logic are established. The threshold state logic is set by the minimum number of endorsements required to commit to the ledger set by the endorsement policy. A commitment to the ledger triggers the final state logic. One or more of post-settlement processes are executed via the final state logic.

In one example embodiment, the exemplary method further includes the step of establishing a threshold state logic via one or more pre-settlement statement(s). The smart contract further includes the one or more pre-settlement statement(s).

In one example embodiment, the exemplary method further includes the step of establishing a final state logic via one or more post-settlement statement(s). The smart contract further includes the one or more post-settlement statement(s).

In the exemplary method, the smart contract further includes one or more threshold endorser peer(s), one or more final state endorser peer(s), and one or more committer peer(s). In one example embodiment, the exemplary method further includes the step of sending the threshold state logic to the one or more threshold peer(s).

In one example embodiment, the exemplary method further includes the step of generating a multistate logic process via the one or more threshold peer(s). The multistate logic process appends to the ledger when the minimum number of threshold endorser peer(s) endorsements is met to commit to the ledger as set by an endorsement policy. In one example embodiment, the exemplary method further includes the step of generating a read-write set input data for post-settlement processes via the multistate logic process. In one example embodiment, the exemplary method further includes the step of receiving input data and generating the read-write set via the one or more pre-settlement statement(s). In one example embodiment, the exemplary method further includes the step of providing the multistate logic process for appending to the ledger via the endorsement policy. In one example embodiment, the exemplary method further includes the step of receiving the final state logic, via the one or more final state endorser peer(s), and generating a multistate logic process for executing the one or more post-settlement process(es).

In one example embodiment, the exemplary method further includes the step of appending to the ledger, via the one or more committer(s), to include updates derived from the one or more post-settlement processes. Accordingly, a further step is contemplated for generating a final read-write set with the one or more committer(s). In one example embodiment, the write set created at commitment is updated to create a final read-write set.

In one example embodiment, the one or more post-settlement processes includes resource-intensive transaction processes. In one example embodiment, the one or more post-settlement processes includes non-reversible logic. In one example embodiment, the one or more post-settlement processes includes a plurality of transactions. In one example embodiment, the one or more post-settlement processes includes a multiplicity of transactions. In one example embodiment, the one or more pre-commit processes minimizes the number of transactions required prior to endorsement and commitment.

FIG. 1D further shows the method 180. As shown, the endorser peers in step 186 iteratively execute the post-endorsement logic of the smart contract. In one example embodiment, the post endorsement logic includes resource intensive transactions. In one example embodiment, the post-endorsement logic includes non-reversible logic.

Once all post-endorsement statements are exhausted, the smart contract from the method 180 ensures that all committer peers provide final validation and generate a final-read write set. Accordingly, the ledger is updated with the final read-write set.

Figure 1E:
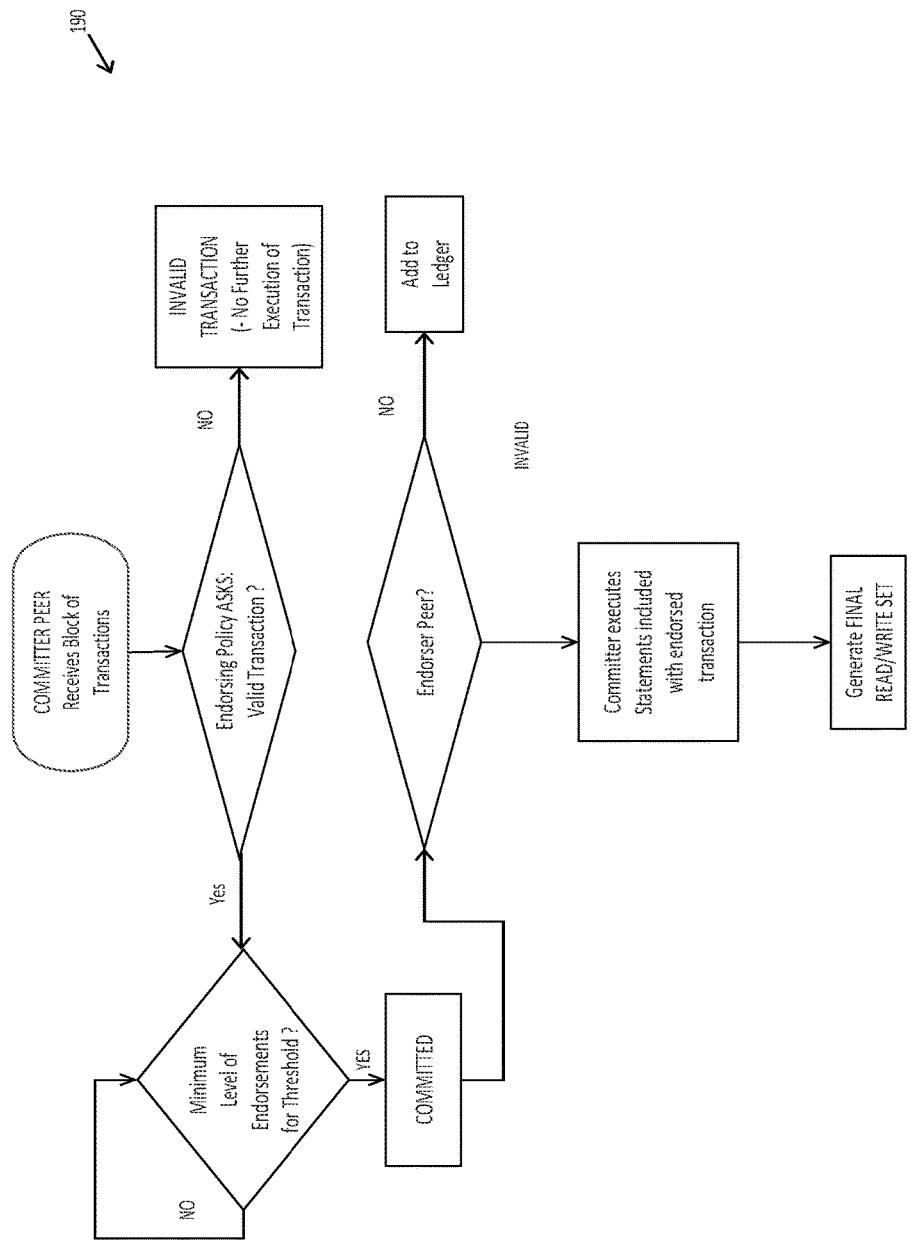
FIG. 1E illustrates a flow diagram, according to example embodiments.

FIG. 1E illustrates a flow diagram of a method 190, according to example embodiments. For the method 190, a committer peer receives a block of transactions. Thereafter, an endorsing policy provided by the associated chaincode iteratively determines receipt of valid transactions. If an invalid transaction is found, then there are no further transactions applied by the method 190. If a valid transaction is found, then one or more endorser peers (a special case of a committer peer) iteratively determines the minimal level of endorsements required by the endorsement policy of the smart contract required for commitment to the ledger.

Shown in FIG. 1E, on commitment the method 190 determines whether post-settlement statements are provided by the smart contract. If there are no post-settlement statements, the method 190 generates a write set that reflects the post endorsement state. Otherwise, if post-settlement statements are included with the chaincode, then the committer(s) executes statements included with the endorsed transaction. Thereafter, in one example embodiment, the method generates a final read-write set.

Figure 2A:
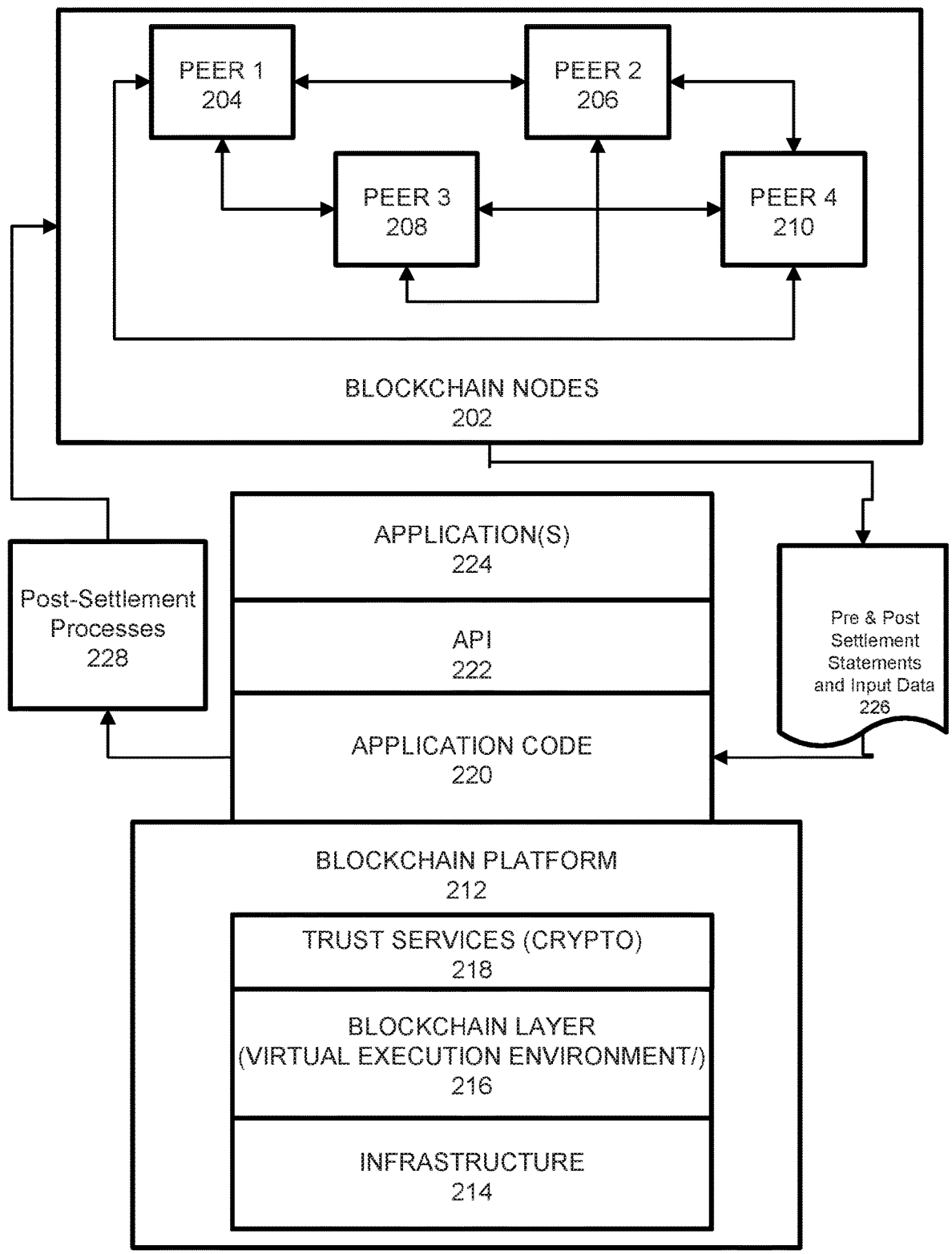
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements as well as usage of the ledger. For example, the information 226 including input data as well as pre- and post-settlement statements accompanying a smart contract can be processed by one or more processing entities (e.g., virtual machines) included in the blockchain layer 216. The result 228 may include execution of post-settlement processes arising from post-settlement statements triggered by the final state logic. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, input data as well as pre- and post-settlement statements accompanying a smart contract can be processed by one or more processing entities (e.g., virtual machines) included in the blockchain layer 216 to define custom logic for execution after a transaction is validated. One function may be to establish customizable post-settlement processes for not only reducing the resources required during simulation and endorsement but also increasing the number of transactions that can be simulated within a defined period, which may be provided to one or more of the nodes 204-210.

Figure 2B:
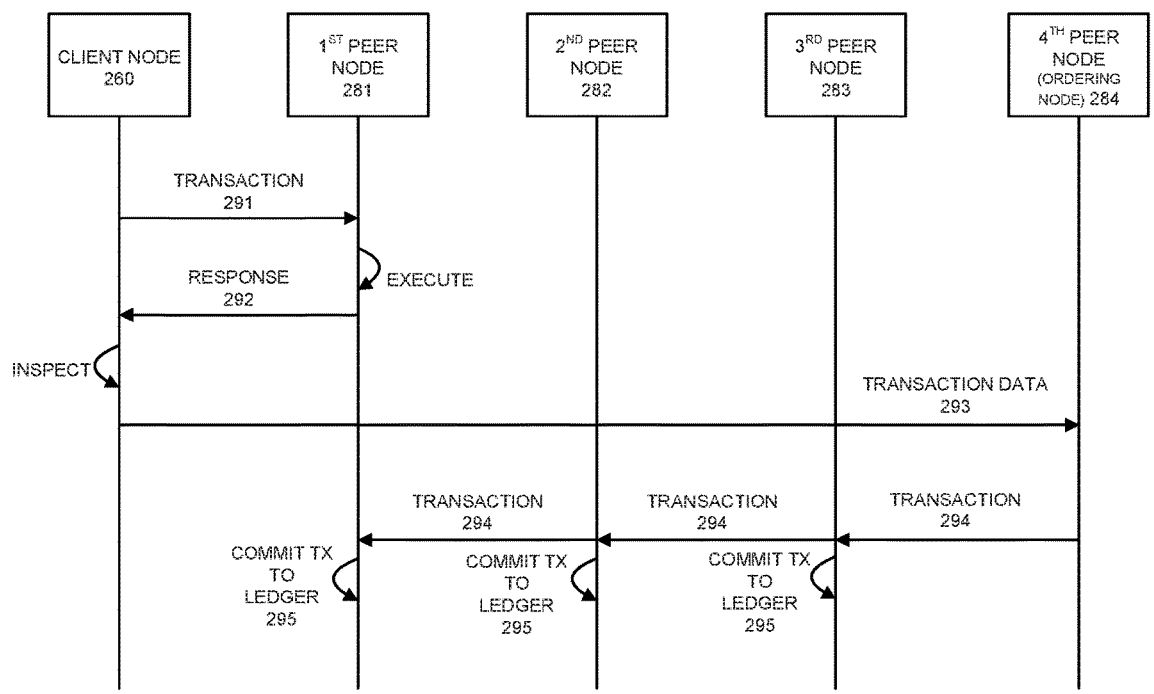
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node(s) 260 to an endorsing peer node(s) 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node(s) 260 initiates the transaction 291 by constructing and sending a request to the peer node(s) 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node(s) 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node(s) 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node(s), and each endorsing node(s) will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
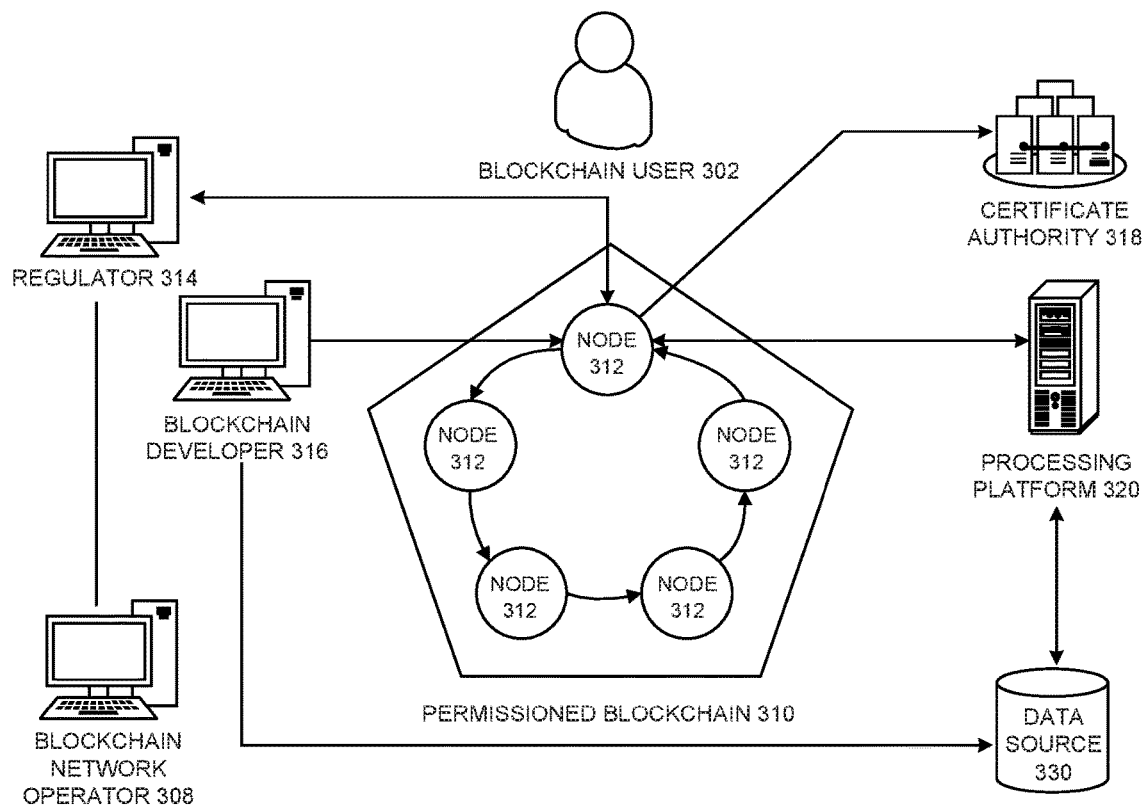
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node(s) 312. Before proceeding with any transactions, the peer node(s) 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
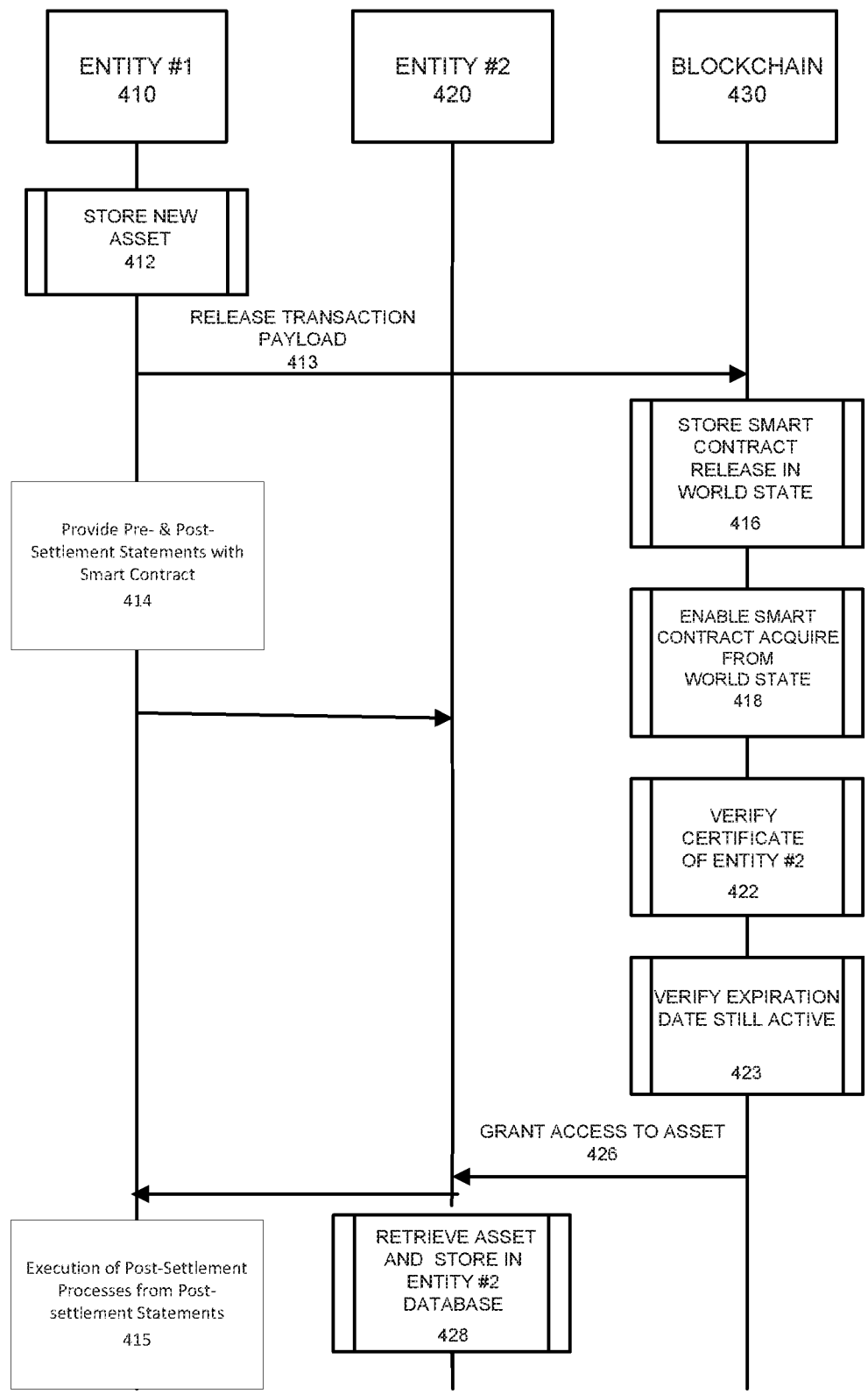
FIG. 4 illustrates a system messaging diagram, according to example embodiments.

FIG. 4 illustrates a system messaging diagram for performing customizable post-settlement processes arising from post-settlement statements triggered by the final state logic, according to example embodiments. Referring to FIG. 4, the system diagram 400 includes an input number of elements such as entity #1 410, entity #2 420 as well as a blockchain 430. Entity #1 410 provides a pre- and post-settlement statements accompanying a smart contract 414 to entity #2 420. The result includes execution of post-settlement processes arising from post-settlement statements triggered by the final state logic 415. The process begins when a new asset is stored 412. A release transaction payload 413. The smart contract release world state is stored 416 on the blockchain 430. The blockchain 430 enables smart contract to acquire from world state 418. Then the blockchain 430 verifies certificate of entity #2 422 and verifies the expiration date is still active 423. Entity #2 is granted access to asset 426 after the certificate of entity #2 and expiration date are verified. Entity #2 then retrieves the asset and stores the asset in entity #2 database 428. In another embodiment the blockchain 430 may be a part of entity #1 410 and/or entity #2 420.

Figure 5A:
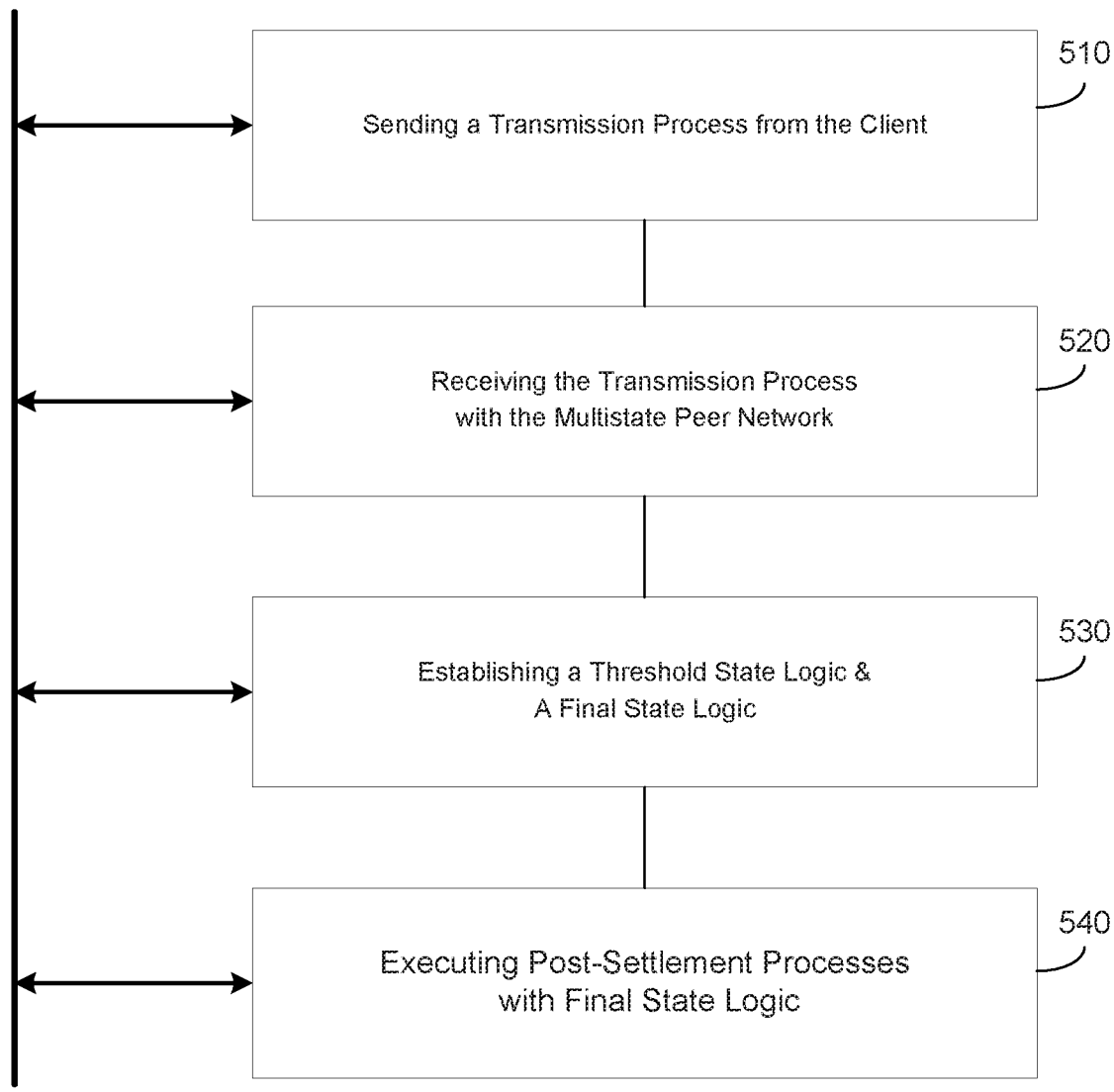
FIG. 5A illustrates a flow diagram, according to example embodiments.

FIG. 5A illustrates a flow diagram 500 of an example method of executing post-settlement processes with a smart contract for a blockchain architecture, according to example embodiments. Referring to FIG. 5A, the method 500 may include one or more of the following steps. In step 510, a transmission process is sent from a client with an application, wherein the application is coupled to the client. The transmission process in step 520 is received from the client via a multistate peer network. In one example embodiment, the multistate peer network includes a ledger, an endorsement policy, and a smart contract. A multistate endorsement based ledger process is generated from the transmission process. In step 530, a threshold state logic and a final state logic are established. The threshold state logic is set by the minimum number of endorsements required to commit to the ledger set by the endorsement policy. A commitment to the ledger triggers the final state logic. One or more of post-settlement processes are executed via the final state logic in step 540.

Figure 5B:
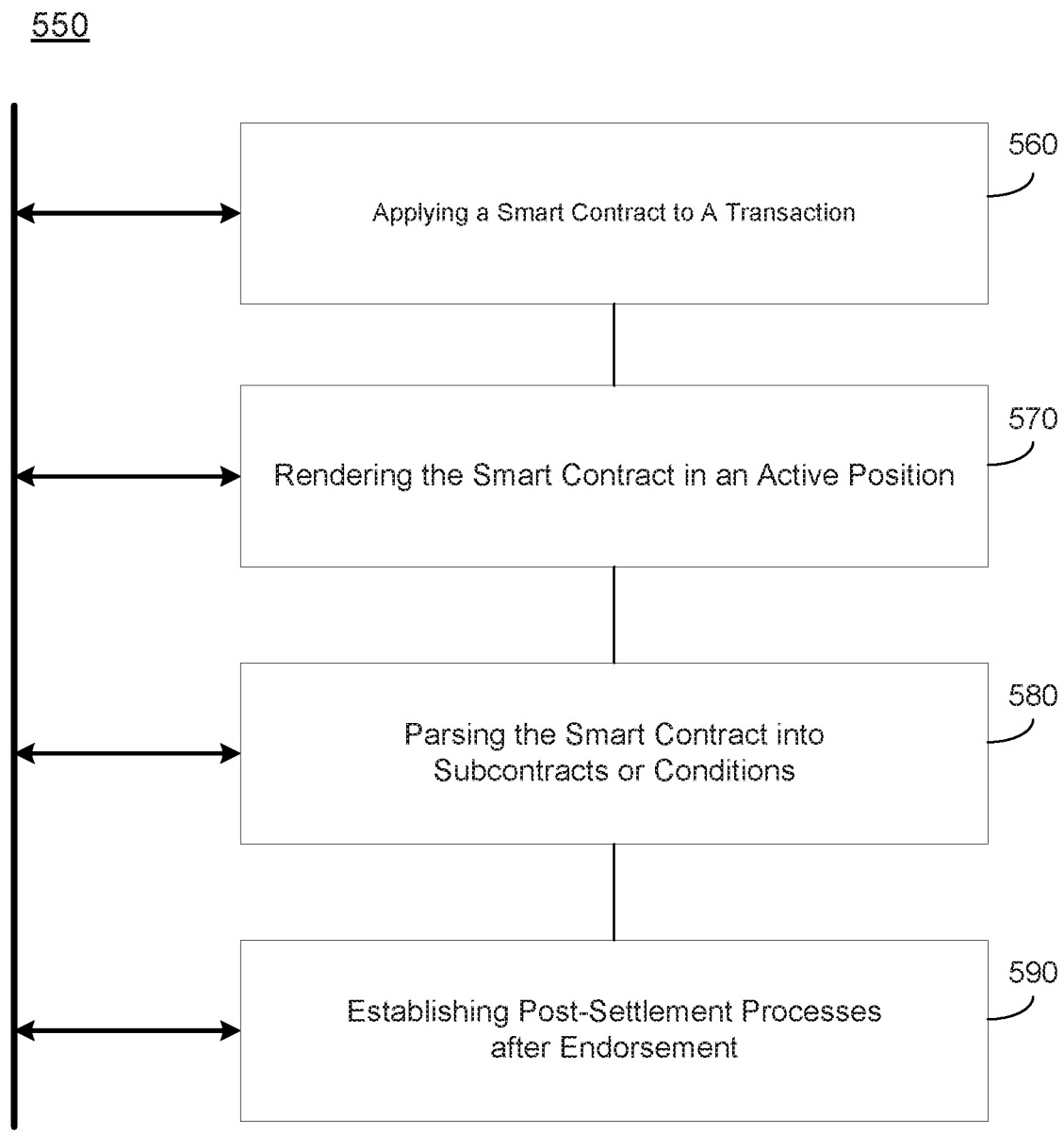
FIG. 5B illustrates a further flow diagram, according to example embodiments.

FIG. 5B illustrates a flow diagram 550 of an example method of executing post-settlement processes in a blockchain, according to example embodiments. In step 560, a smart contract is applied to a transaction within the blockchain. During the entirety of the transaction, the smart contract is rendered in an open or active position in step 570. Accordingly, the smart contract is parsed based on the sequence of the transaction to divide into sub-contracts or conditions in step 580. Step 590 of FIG. 5B further shows an enhancement in one example embodiment where this method may also include post-settlement processes that are established after endorsement and commitment to the ledger.

Figure 6A:
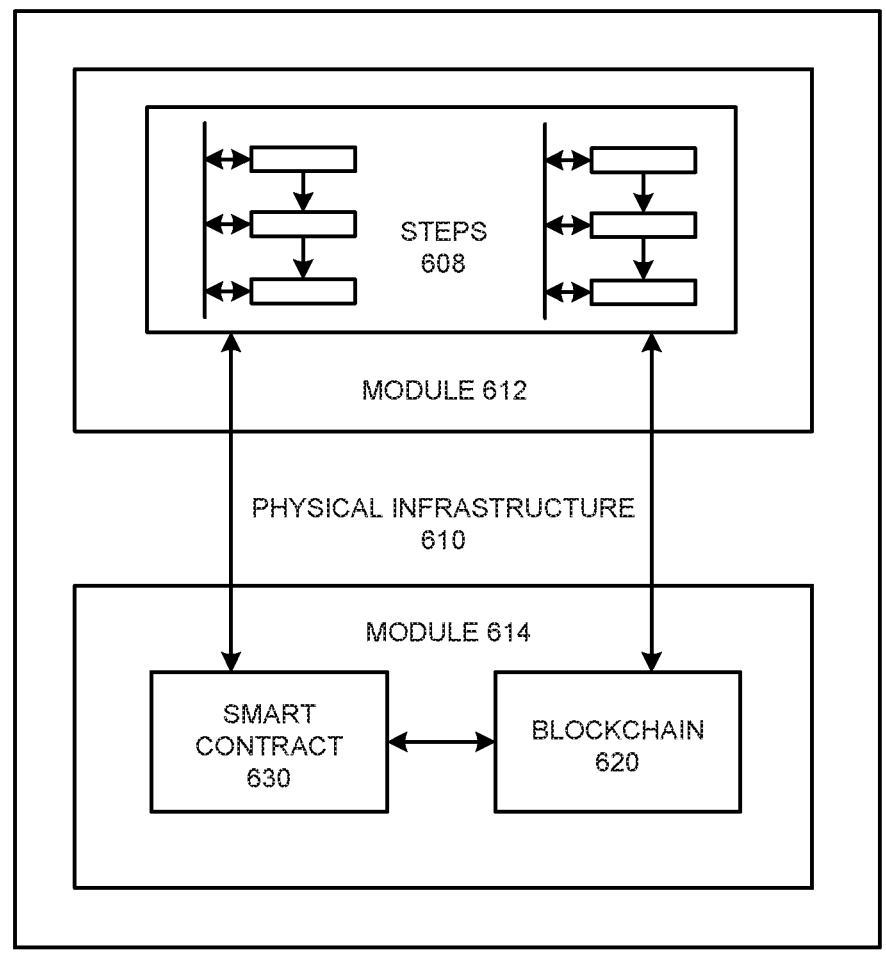
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
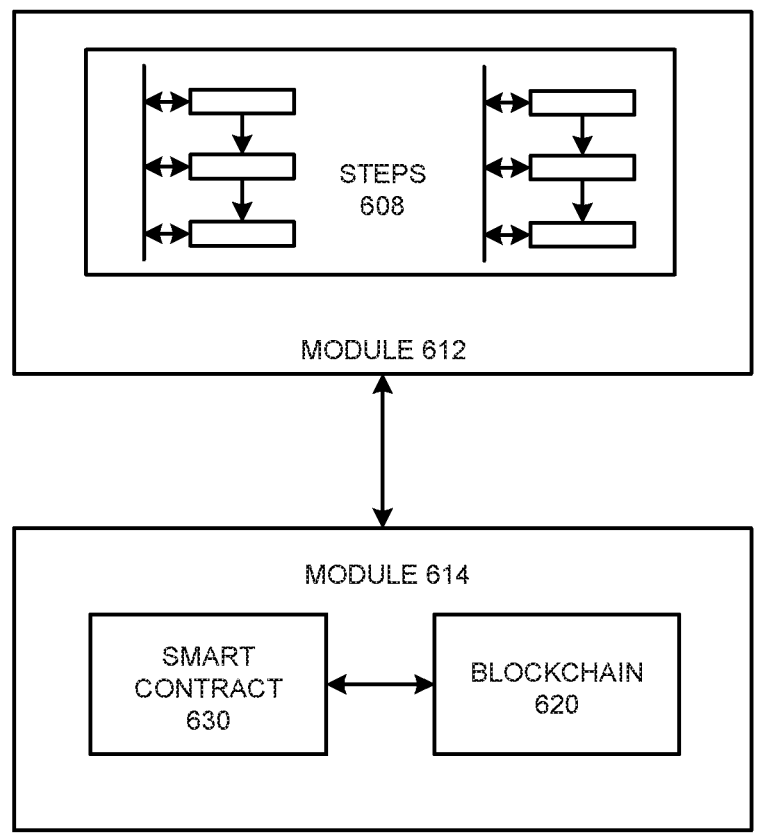
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
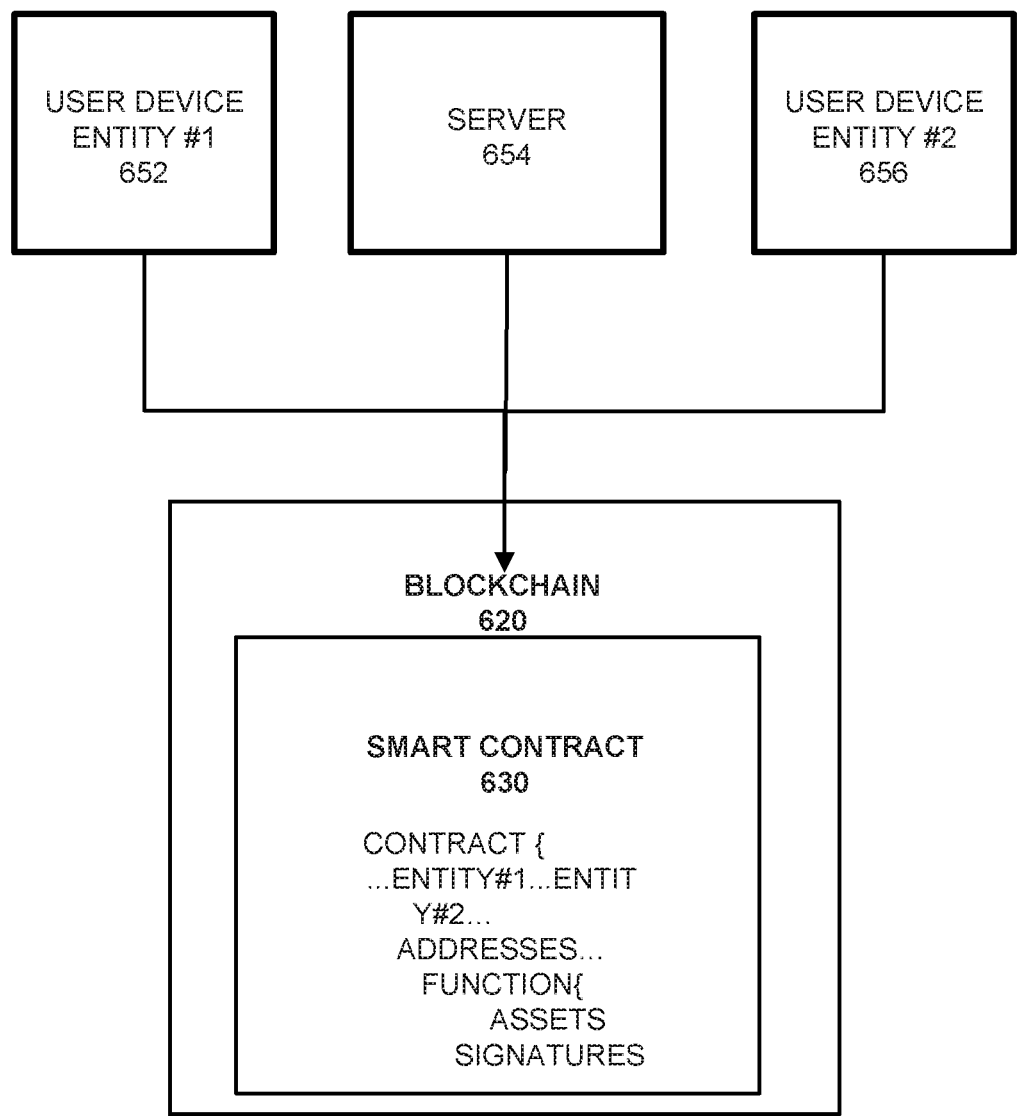
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
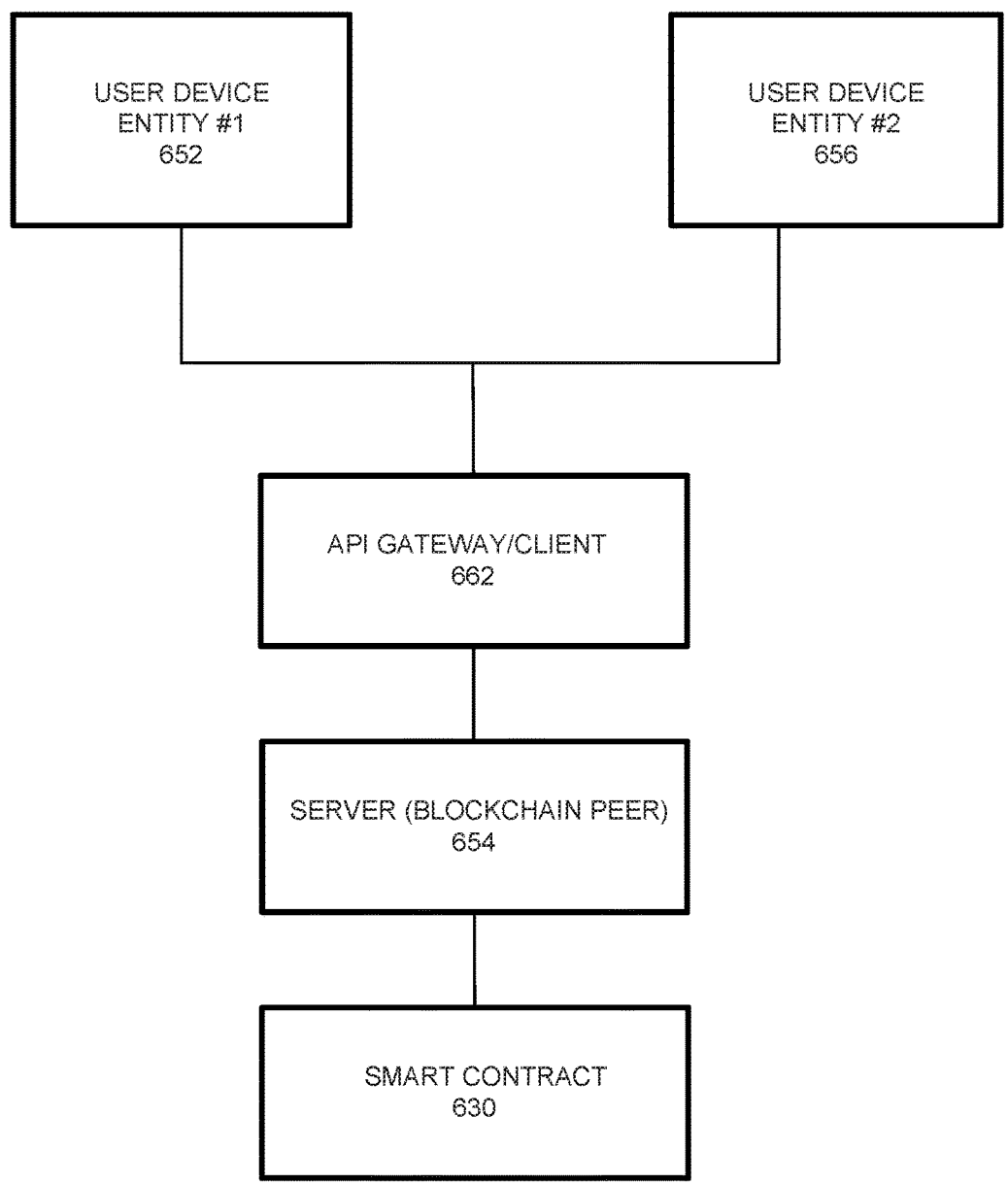
FIG. 6D illustrates another an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
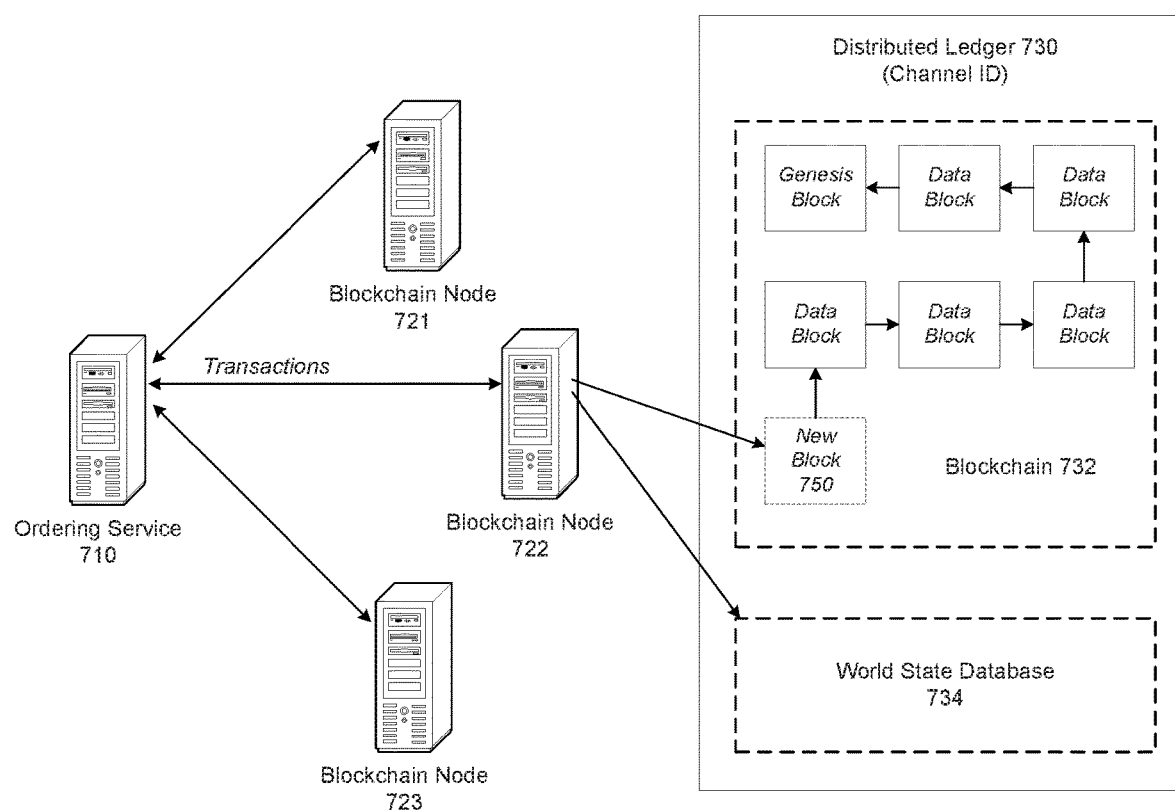
FIG. 7A illustrates a process of new data being added to a database, according to example embodiments.
Figure 7B:
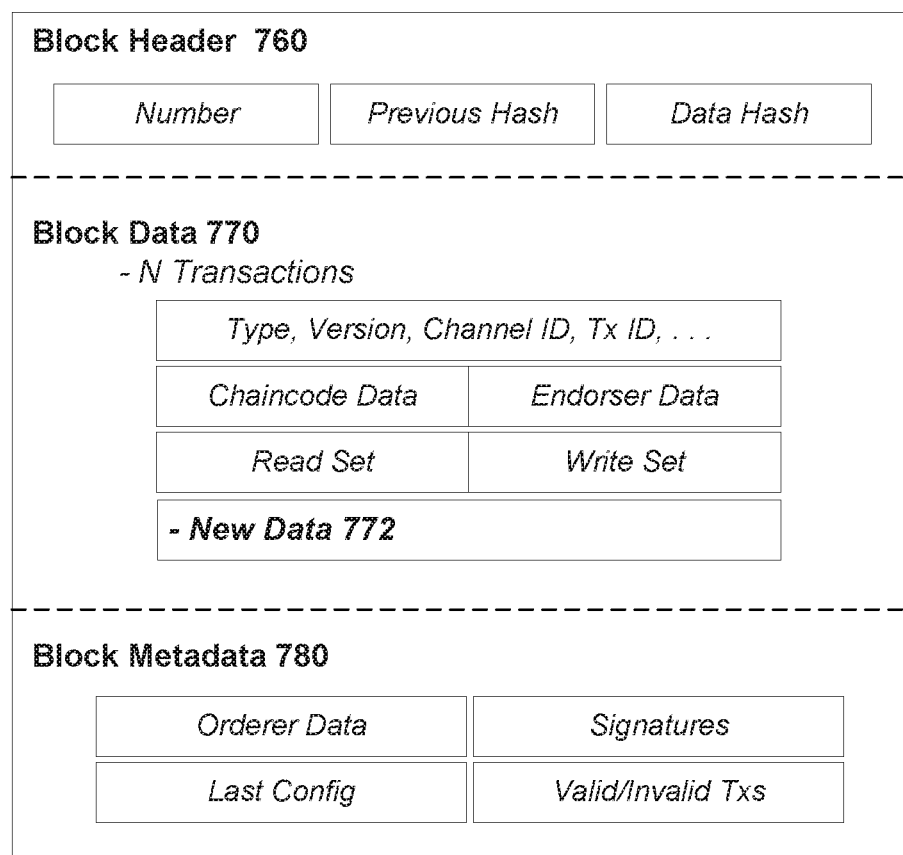
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer(s) validates the transaction within the new block 750 by checking to make sure that the read set and the write set still match the current world state in the state database 734. Specifically, the committing peer(s) can determine whether the read data that existed when the endorsers simulated the transaction is identical to the current world state in the state database 734. When the committing peer(s) validates the transaction, the transaction is written to the blockchain 732 on the distributed ledger 730, and the state database 734 is updated with the write data from the read-write set. If a transaction fails, that is, if the committing peer(s) finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
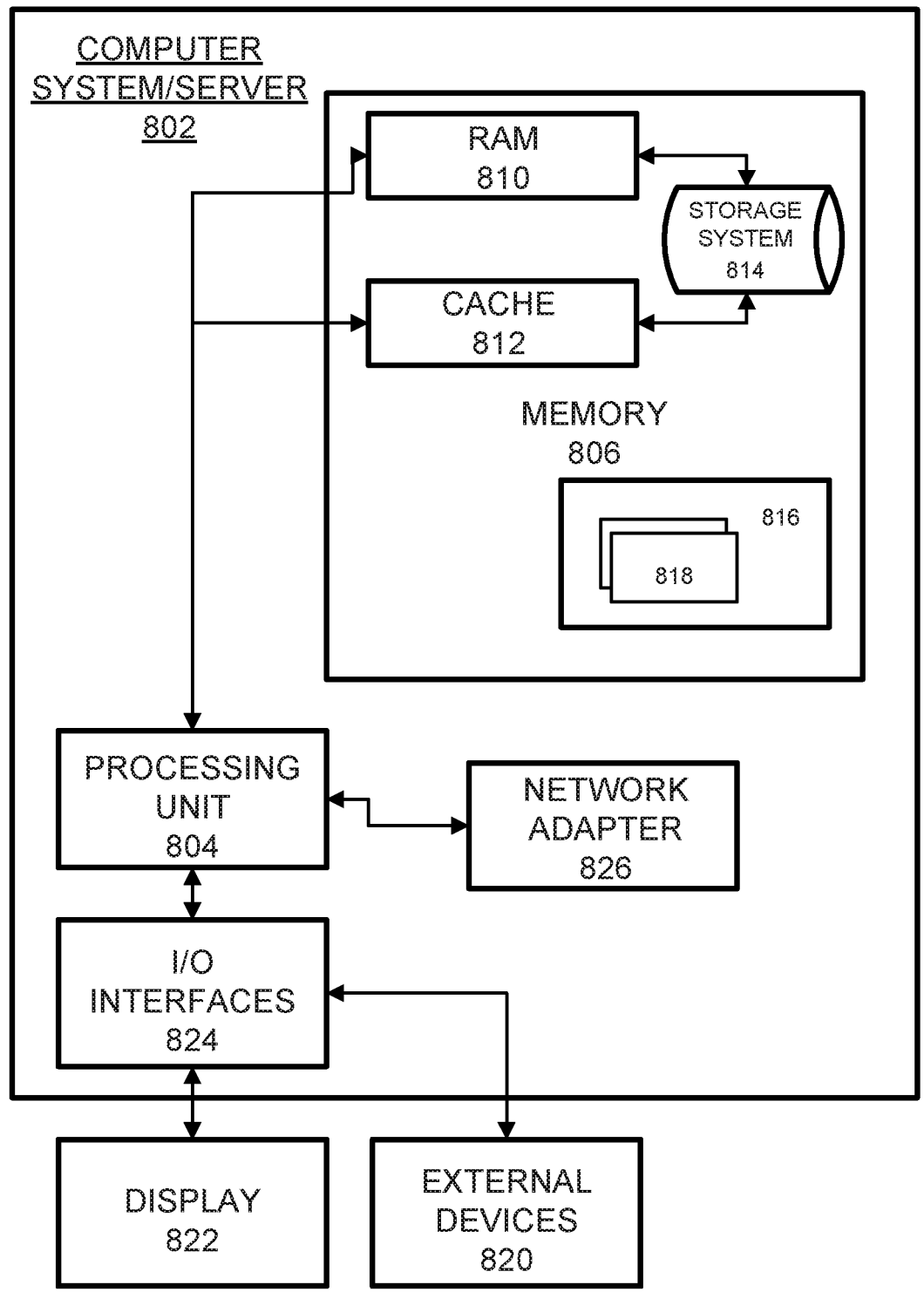
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system comprising:
a processor configured to:
simulate a blockchain transaction against a current state of a blockchain based on a first set of statements included in a blockchain smart contract, and based on the simulated blockchain transaction, generate a read set that includes key-value pairs that are read from the blockchain and a write set that includes key-value pairs that are written to the blockchain during an execution of the first set of statements,
store the read set and the write set in a temporary memory of a virtual machine;
sign the read set and the write set of the simulated blockchain transaction with an endorsement signature and transmit an endorsement response including the signed read set and write set to a client application that submitted the simulated blockchain transaction,
detect a block to be committed to the blockchain, where the block includes the simulated blockchain transaction,
execute a second set of statements included in the blockchain smart contract which are different than the first set of statements in response to detecting the block, on the blockchain, wherein the execution of the second set of statements generates an updated read set based on key-value pairs that are read from the blockchain during execution of the second set of statements and an updated write set based on key-value pairs that are written to the blockchain during execution of the second set of statements, and
commit the block including the simulated blockchain transaction with the updated read set and the updated write set to the blockchain.

2. The system according to claim 1 wherein the first set of statements include one or more pre-settlement statements and the second set of statements include one or more post-settlement statements.

3. The system according to claim 1 wherein the second set of statements comprise non-reversible logic.

4. The system according to claim 1 wherein the block is received from an ordering service of the blockchain.

5. The system according to claim 1 wherein the first and second sets of statements are identified within source code of the blockchain smart contract.

6. The system according to claim 1 wherein the first set of statements receives input data to generate the read set and the write set.

7. The system according to claim 1 wherein the second set of statements comprises an operation performed with an external system.

8. The system according to claim 1 wherein the updated write set includes a change to the write set.

9. A method comprising:
simulating, by a processor, a blockchain transaction against a current state of a blockchain based on a first set of statements included in a blockchain smart contract, and based on the simulated blockchain transaction, generate a read set that includes key-value pairs that are read from the blockchain and a write set that includes key-value pairs that are written to the blockchain during an execution of a first set of statements;
storing the read set and the write set in a temporary memory of a virtual machine;
signing the read set and the write set of the simulated blockchain transaction with an endorsement signature and transmitting an endorsement response including the signed read set and write set to a client application that submitted the simulated blockchain transaction;
detecting a block to be committed to the blockchain, where the block includes the simulated blockchain transaction,
executing a second set of statements included in the blockchain smart contract which are different than the first set of statements in response to detecting the block, on the blockchain, wherein the execution of the second set of statements generates an updated read set based on key-value pairs that are read from the blockchain during execution of the second set of statements and an updated write set based on key-value pairs that are written to the blockchain during execution of the second set of statements; and
committing the block including the simulated blockchain transaction with the updated read set and the updated write set to the blockchain.

10. The method according to claim 9 wherein the first set of statements include one or more pre-settlement statements and the second set of statements include one or more post-settlement statements.

11. The method according to claim 9 wherein the second set of statements comprise non-reversible logic.

12. The method according to claim 9 wherein the block is received from an ordering service of the blockchain.

13. The method according to claim 9 wherein the first and second sets of statements are identified within source code of the blockchain transaction.

14. The method according to claim 9 wherein the first set of statements receive input data and generate the read set and the write set.

15. The method according to claim 9 wherein the second set of statements include an operation performed with an external system.

16. A non-transitory computer-readable medium comprising instructions, that when executed by a processor, cause the processor to perform:
simulating a blockchain transaction against a current state of a blockchain based on a first set of statements included in a blockchain smart contract, and based on the simulated blockchain transaction, generate a read set that includes key-value pairs that are read from the blockchain and a write set that includes key-value pairs that are written to the blockchain during an execution of a first set of statements;
storing the read set and the write set in a temporary memory of a virtual machine;
signing the read set and the write set of the simulated blockchain transaction with an endorsement signature and transmitting an endorsement response including the signed read set and write set to a client application that submitted the simulated blockchain transaction;
detecting a block to be committed to the blockchain, where the block includes the simulated blockchain transaction,
executing a second set of statements included in the blockchain smart contract which are different than the first set of statements in response to detecting the block, on the blockchain, wherein the execution of the second set of statements generates an updated read set based on key-value pairs that are read from the blockchain during execution of the second set of statements and an updated write set based on key-value pairs that are written to the blockchain during execution of the second set of statements; and committing the block including the simulated blockchain transaction with the updated read set and the updated write set to the blockchain.

\* \* \* \* \*